(12) United States Patent
Lee et al.

(10) Patent No.: US 10,795,562 B2
(45) Date of Patent: *Oct. 6, 2020

(54) PORTABLE ELECTRONIC DEVICE AND METHOD OF CONTROLLING SAME

(71) Applicant: BLACKBERRY LIMITED, Waterloo (CA)

(72) Inventors: John Jong-Suk Lee, Thornhill (CA); Jason Tyler Griffin, Kitchener (CA); Michael George Langlois, Almonte (CA); Alen Mujkic, Mississauga (CA); David William Bukurak, Ottawa (CA)

(73) Assignee: BlackBerry Limited, Waterloo (CA)

( * ) Notice: Subject to any disclaimer, the term of this patent is extended or adjusted under 35 U.S.C. 154(b) by 258 days.

This patent is subject to a terminal disclaimer.

(21) Appl. No.: 14/268,633

(22) Filed: May 2, 2014

(65) Prior Publication Data

US 2014/0245220 A1    Aug. 28, 2014

Related U.S. Application Data

(63) Continuation of application No. 12/727,979, filed on Mar. 19, 2010, now Pat. No. 8,756,522.

(51) Int. Cl.
*G06F 3/0485*    (2013.01)
*G06F 3/0488*    (2013.01)

(52) U.S. Cl.
CPC ........ *G06F 3/0485* (2013.01); *G06F 3/04883* (2013.01); *G06F 3/04886* (2013.01)

(58) Field of Classification Search
CPC .... G06F 3/017; G06F 3/04842; G06F 3/0488; G06F 3/044; G06F 3/0482;
(Continued)

(56) References Cited

U.S. PATENT DOCUMENTS

| 4,680,577 A | * | 7/1987 | Straayer ............... G06F 3/0338 345/160 |
| 5,121,114 A | | 6/1992 | Nagasawa et al. |

(Continued)

FOREIGN PATENT DOCUMENTS

| CN | 101356493 A | 1/2009 |
| CN | 101393506 A | 3/2010 |

(Continued)

OTHER PUBLICATIONS

English translation of Office Action dated Jun. 16, 2014, issued in respect of corresponding Chinese Patent Application No. 201110065617.8.

(Continued)

*Primary Examiner* — Renee D Chavez
*Assistant Examiner* — Carl P Lobo
(74) *Attorney, Agent, or Firm* — Borden Ladner Gervais LLP; Geoffrey deKleine

(57) ABSTRACT

A method of controlling a portable electronic device that has a touch-sensitive display includes displaying information on the touch-sensitive display, detecting a gesture on the touch-sensitive display, scrolling through the information in a first scrolling mode when the gesture is associated with a first area of the touch-sensitive display, and scrolling through the information in a second scrolling mode when the gesture is associated with a second area of the touch-sensitive display.

7 Claims, 5 Drawing Sheets

(58) Field of Classification Search
CPC ....... G06F 2203/04808; G06F 3/04845; G06F 17/30991; G06F 3/0233; G06F 3/04883; G06F 3/0485; G06F 17/21; G06F 3/04855; G06F 3/04817; G06F 3/016; G06F 3/0416; G06F 3/0237; G06F 3/0236; G06F 8/33; G06F 3/04886; G06F 8/34; G06F 17/30899; G06F 3/0481; G06F 8/38; G06F 3/04815; G06F 3/04812; G06F 3/04847; G06F 16/957; G06F 3/04; G06F 16/44; G06F 3/147; G06F 40/106; G06F 16/33

See application file for complete search history.

(56) References Cited

U.S. PATENT DOCUMENTS

| | | | | |
|---|---|---|---|---|
| 5,666,552 | A * | 9/1997 | Greyson | G06F 17/24 345/157 |
| 5,923,861 | A * | 7/1999 | Bertram | G06F 3/04855 715/786 |
| 6,049,334 | A * | 4/2000 | Bates | G06F 3/0481 715/745 |
| 6,094,197 | A * | 7/2000 | Buxton | G06F 3/0482 341/22 |
| 6,292,179 | B1 * | 9/2001 | Lee | G06F 3/0236 345/173 |
| 6,310,610 | B1 | 10/2001 | Beaton et al. | |
| 6,411,283 | B1 | 6/2002 | Murphy | |
| 6,714,221 | B1 | 3/2004 | Christie et al. | |
| 6,876,312 | B2 * | 4/2005 | Yu | G06F 3/0213 341/20 |
| 6,954,899 | B1 * | 10/2005 | Anderson | G06F 3/016 345/157 |
| 7,023,428 | B2 * | 4/2006 | Pihlaja | G06F 3/0488 345/157 |
| 7,030,863 | B2 * | 4/2006 | Longe | G06F 3/0237 345/172 |
| 7,091,954 | B2 * | 8/2006 | Iesaka | G06F 1/1616 345/156 |
| 7,477,233 | B2 * | 1/2009 | Duncan | G06F 3/04883 178/18.01 |
| 7,508,324 | B2 * | 3/2009 | Suraqui | G06F 3/0237 341/20 |
| 7,571,384 | B1 * | 8/2009 | Webb | G06F 3/04883 715/268 |
| 7,659,887 | B2 * | 2/2010 | Larsen | G06F 3/0213 341/21 |
| 7,958,455 | B2 | 6/2011 | Doar | |
| 7,982,716 | B2 * | 7/2011 | Bowen | G06F 3/0234 345/168 |
| 8,271,036 | B2 * | 9/2012 | Griffin | G06F 1/1626 455/168.1 |
| 8,438,504 | B2 * | 5/2013 | Cranfill | G06F 3/0481 715/702 |
| 8,537,117 | B2 * | 9/2013 | Griffin | G06F 1/1626 340/407.1 |
| 8,564,555 | B2 * | 10/2013 | Day | G06F 3/0416 178/18.01 |
| 8,756,522 | B2 * | 6/2014 | Lee | G06F 3/04883 715/773 |
| 8,830,176 | B2 * | 9/2014 | Bos | G06F 3/0237 345/157 |
| 8,904,309 | B1 * | 12/2014 | Zhai | G06F 3/0482 715/773 |
| 9,081,499 | B2 * | 7/2015 | Kondo | G06F 3/0416 |
| 9,684,521 | B2 * | 6/2017 | Shaffer | G06F 9/4443 |
| 2002/0030667 | A1 * | 3/2002 | Hinckley | C08F 236/12 345/173 |
| 2002/0067346 | A1 * | 6/2002 | Mouton | G06F 3/04886 345/173 |
| 2002/0135602 | A1 | 9/2002 | Davis et al. | |
| 2003/0043123 | A1 | 3/2003 | Hinckley et al. | |
| 2003/0043174 | A1 | 3/2003 | Hinckley et al. | |
| 2003/0137522 | A1 * | 7/2003 | Kaasila | G06T 3/4015 345/619 |
| 2004/0021676 | A1 | 2/2004 | Chen et al. | |
| 2004/0141009 | A1 * | 7/2004 | Hinckley | G06F 3/03547 715/786 |
| 2004/0263487 | A1 * | 12/2004 | Mayoraz | G06F 3/0481 345/173 |
| 2005/0024341 | A1 | 2/2005 | Gillespie et al. | |
| 2005/0221268 | A1 * | 10/2005 | Chaar | G09B 7/02 434/350 |
| 2006/0026535 | A1 | 2/2006 | Hotelling et al. | |
| 2006/0033701 | A1 * | 2/2006 | Wilson | G06F 1/1616 345/156 |
| 2006/0038796 | A1 * | 2/2006 | Hinckley | G06F 3/03547 345/173 |
| 2006/0055669 | A1 * | 3/2006 | Das | G06F 3/0233 345/156 |
| 2006/0119582 | A1 * | 6/2006 | Ng | G06F 3/04883 345/168 |
| 2006/0164399 | A1 * | 7/2006 | Cheston | G06F 3/0485 345/173 |
| 2006/0176283 | A1 * | 8/2006 | Suraqui | G06F 3/0237 345/169 |
| 2006/0197753 | A1 * | 9/2006 | Hotelling | G06F 1/1626 345/173 |
| 2006/0242596 | A1 * | 10/2006 | Armstrong | G06F 3/0482 715/786 |
| 2006/0242607 | A1 * | 10/2006 | Hudson | G06F 3/04817 715/863 |
| 2006/0250376 | A1 * | 11/2006 | Takahashi | G06F 3/044 345/173 |
| 2006/0253793 | A1 * | 11/2006 | Zhai | G06F 3/04883 715/773 |
| 2006/0256083 | A1 * | 11/2006 | Rosenberg | G06F 3/013 345/156 |
| 2006/0267946 | A1 * | 11/2006 | Wecker | G06F 1/1613 345/168 |
| 2007/0075984 | A1 | 4/2007 | Chiu et al. | |
| 2007/0091070 | A1 * | 4/2007 | C. Larsen | G06F 3/0213 345/168 |
| 2007/0125633 | A1 * | 6/2007 | Boillot | G06F 3/011 200/52 R |
| 2007/0130547 | A1 * | 6/2007 | Boillot | G06F 3/017 715/863 |
| 2007/0159362 | A1 * | 7/2007 | Shen | G06F 3/03545 341/20 |
| 2007/0185631 | A1 | 8/2007 | Yeh et al. | |
| 2007/0220442 | A1 | 9/2007 | Bohan et al. | |
| 2008/0005703 | A1 * | 1/2008 | Radivojevic | G06F 3/011 715/863 |
| 2008/0036743 | A1 * | 2/2008 | Westerman | G06F 3/038 345/173 |
| 2008/0094369 | A1 | 4/2008 | Ganatra et al. | |
| 2008/0158024 | A1 * | 7/2008 | Steiner | G06F 3/0234 341/34 |
| 2008/0165141 | A1 * | 7/2008 | Christie | G06F 3/044 345/173 |
| 2008/0165142 | A1 * | 7/2008 | Kocienda | G06F 3/04886 345/173 |
| 2008/0168367 | A1 * | 7/2008 | Chaudhri | G06F 3/04817 715/764 |
| 2008/0180410 | A1 * | 7/2008 | McCall | G06T 11/203 345/179 |
| 2008/0220752 | A1 * | 9/2008 | Forstall | H04M 1/56 455/415 |
| 2008/0259040 | A1 | 10/2008 | Ording et al. | |
| 2008/0316183 | A1 * | 12/2008 | Westerman | G06F 3/0416 345/173 |
| 2008/0318635 | A1 * | 12/2008 | Yoon | G06F 1/1624 455/566 |
| 2009/0027337 | A1 * | 1/2009 | Hildreth | G06F 3/011 345/158 |
| 2009/0031240 | A1 * | 1/2009 | Hildreth | G06F 3/011 715/772 |

(56) References Cited

U.S. PATENT DOCUMENTS

| | | | |
|---|---|---|---|
| 2009/0058830 A1* | 3/2009 | Herz | G06F 3/044 345/173 |
| 2009/0077464 A1* | 3/2009 | Goldsmith | G06F 3/0237 715/257 |
| 2009/0100380 A1 | 4/2009 | Gardner et al. | |
| 2009/0109182 A1* | 4/2009 | Fyke | G06F 3/0488 345/173 |
| 2009/0150426 A1* | 6/2009 | Cannon | G06F 17/246 |
| 2009/0167700 A1* | 7/2009 | Westerman | G06F 3/0485 345/173 |
| 2009/0178007 A1* | 7/2009 | Matas | G06F 3/0482 715/835 |
| 2009/0213081 A1* | 8/2009 | Case, Jr. | G06F 1/1616 345/173 |
| 2009/0228825 A1* | 9/2009 | Van Os | G06F 3/0488 715/780 |
| 2009/0228842 A1* | 9/2009 | Westerman | G06F 3/04883 715/863 |
| 2009/0229892 A1* | 9/2009 | Fisher | G06F 1/1626 178/18.03 |
| 2009/0256802 A1* | 10/2009 | Lou | G06F 3/042 345/157 |
| 2009/0282360 A1 | 11/2009 | Park et al. | |
| 2009/0289917 A1 | 11/2009 | Saunders | |
| 2009/0295713 A1* | 12/2009 | Piot | G06F 3/0346 345/156 |
| 2009/0327976 A1* | 12/2009 | Williamson | G06F 3/04883 715/863 |
| 2010/0020018 A1* | 1/2010 | Yang | G06F 3/017 345/169 |
| 2010/0045703 A1* | 2/2010 | Kornmann | G06F 1/1626 345/653 |
| 2010/0058227 A1* | 3/2010 | Danton | G06F 3/04855 715/786 |
| 2010/0083166 A1 | 4/2010 | Happonen | |
| 2010/0123669 A1 | 5/2010 | Chae et al. | |
| 2010/0123724 A1* | 5/2010 | Moore | G06F 3/04817 345/473 |
| 2010/0156813 A1* | 6/2010 | Duarte | G06F 3/0488 345/173 |
| 2010/0162160 A1* | 6/2010 | Stallings | G06F 3/0485 715/784 |
| 2010/0197352 A1* | 8/2010 | Runstedler | G06F 3/0233 455/566 |
| 2010/0231612 A1* | 9/2010 | Chaudhri | G06F 3/04886 345/684 |
| 2010/0235729 A1 | 9/2010 | Kocienda et al. | |
| 2010/0245395 A1* | 9/2010 | LeBert | G06F 1/169 345/661 |
| 2010/0259562 A1 | 10/2010 | Miyazawa et al. | |
| 2011/0035209 A1 | 2/2011 | MacFarlane | |
| 2011/0122159 A1* | 5/2011 | Bergsten | G06F 3/04886 345/684 |
| 2011/0167341 A1 | 7/2011 | Cranfill et al. | |
| 2011/0210922 A1 | 9/2011 | Griffin | |
| 2011/0227834 A1* | 9/2011 | Yang | G06F 1/1662 345/169 |
| 2011/0231789 A1* | 9/2011 | Bukurak | G06F 3/04883 715/773 |
| 2011/0239153 A1 | 9/2011 | Carter et al. | |
| 2011/0248945 A1* | 10/2011 | Higashitani | G06F 3/04886 345/173 |
| 2011/0304541 A1* | 12/2011 | Dalal | G06F 3/017 345/158 |
| 2012/0119997 A1* | 5/2012 | Gutowitz | G06F 3/0219 345/168 |
| 2012/0144299 A1* | 6/2012 | Patel | G06F 3/0488 715/702 |
| 2013/0113717 A1* | 5/2013 | Van Eerd | G06F 3/04883 345/173 |
| 2013/0241847 A1* | 9/2013 | Shaffer | G06F 3/038 345/173 |
| 2013/0285926 A1* | 10/2013 | Griffin | G06F 3/04883 345/173 |
| 2014/0078063 A1* | 3/2014 | Bathiche | G06F 3/0234 345/168 |
| 2014/0109016 A1* | 4/2014 | Ouyang | G06F 17/24 715/856 |
| 2014/0189569 A1* | 7/2014 | Eleftheriou | G06F 3/0233 715/773 |
| 2014/0292658 A1* | 10/2014 | Lee | G06F 3/021 345/168 |
| 2014/0306897 A1* | 10/2014 | Cueto | G06F 3/04883 345/173 |
| 2014/0306898 A1* | 10/2014 | Cueto | G06F 3/0234 345/173 |
| 2014/0306899 A1* | 10/2014 | Hicks | G06F 3/04812 345/173 |
| 2014/0310805 A1* | 10/2014 | Kandekar | G06F 21/36 726/19 |
| 2015/0261418 A1* | 9/2015 | Heo | G06F 3/04842 345/661 |
| 2016/0004401 A1* | 1/2016 | McCommons | G06F 3/0485 715/723 |

FOREIGN PATENT DOCUMENTS

| | | |
|---|---|---|
| EP | 1674977 A2 | 6/2006 |
| EP | 2068236 A1 | 6/2009 |
| WO | 2005064587 A2 | 7/2005 |
| WO | 2006020305 A2 | 2/2006 |
| WO | 2008/025370 A1 | 3/2008 |
| WO | 2009117685 A2 | 9/2009 |
| WO | 2010/026493 A1 | 3/2010 |

OTHER PUBLICATIONS

Office Action dated Feb. 29, 2016, issued in respect of corresponding European Patent Application No. 10157013.3.

European Search Report for Application No. EP10157013, dated Jul. 6, 2010, 6 Pages.

Examiner's Report dated Mar. 26, 2013, issued in respect of corresponding Canadian Patent Application No. 2,731,603.

Office Action dated May 31, 2013, issued in respect of corresponding Chinese Patent Application No. 201110065617.8.

Office Action dated Sep. 5, 2012, issued in respect of corresponding Chinese Patent Application No. 201110065617.8.

Summons to Attend Oral Proceedings dated Nov. 2, 2016, issued in respect of corresponding European Patent Application No. 10157013.3.

Examiner's Report dated Jan. 9, 2014, issued in respect of corresponding Canadian Patent Application No. 2,731,603.

Office Action dated Dec. 2, 2013, issued in respect of corresponding Chinese Patent Application No. 201110065617.8.

Office Action dated Jun. 16, 2014, issued in respect of corresponding Chinese Patent Application No. 201110065617.8.

Indian Patent Application No. 431/CHE/2011, Office Action dated May 25, 2017.

* cited by examiner

PORTABLE ELECTRONIC DEVICE AND METHOD OF CONTROLLING SAME

CROSS REFERENCE TO RELATED APPLICATIONS

This application is a Continuation of U.S. patent application Ser. No. 12/727,979 filed Mar. 19, 2010, which is incorporated herein by reference in its entirety.

FIELD OF TECHNOLOGY

The present disclosure relates to portable electronic devices, including but not limited to portable electronic devices having touch screen displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in electronic devices with touch-sensitive displays are desirable.

DETAILED DESCRIPTION

Figure 1:
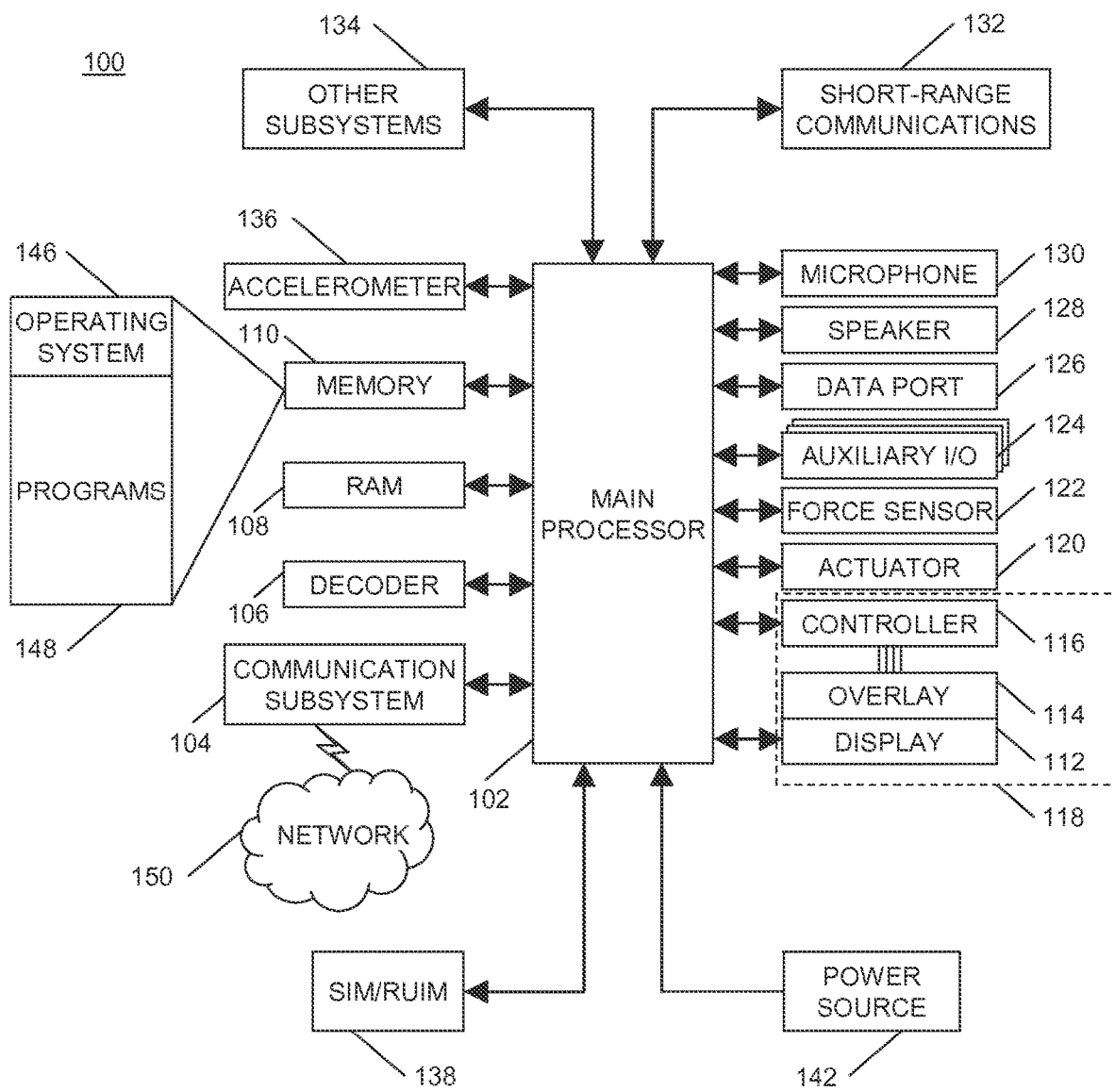
FIG. 1 is a block diagram of a portable electronic device in accordance with the present disclosure.

The following describes an apparatus for and method of scrolling through information displayed on a touch-sensitive display of a portable electronic device. A gesture on the touch-sensitive display is detected and an origin and direction of gesture is determined. The information is scrolled in a mode dependent on the origin of the gesture.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, wirelessly enabled notebook computers, and so forth. The portable electronic device may also be a portable electronic device without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132, and other device subsystems 134. Interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110.

Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

The actuator(s) 120 may be depressed by applying sufficient force to the touch-sensitive display 118 to overcome the actuation force of the actuator 120. The actuator 120 may be actuated by pressing anywhere on the touch-sensitive display 118. The actuator 120 may provide input to the processor 102 when actuated. Actuation of the actuator 120 may result in provision of tactile feedback.

A mechanical dome switch actuator may be utilized. In this example, tactile feedback is provided when the dome collapses due to imparted force and when the dome returns to the rest position after release of the switch.

Alternatively, the actuator 120 may comprise one or more piezoelectric (piezo) actuators that provide tactile feedback for the touch-sensitive display 118. Contraction of the piezo actuator(s) applies a spring-like force, for example, opposing a force externally applied to the touch-sensitive display 118. Each piezo actuator includes a piezoelectric device, such as a piezoelectric disk, adhered to a substrate such as a metal substrate. The substrate bends when the piezoelectric device contracts due to build up of charge/voltage at the piezoelectric device or in response to a force, such as an external force applied to the touch-sensitive display 118. The charge/voltage may be adjusted by varying the applied voltage or current, thereby controlling the force applied by the piezo actuators. The charge/voltage at the piezo actuator may be removed by a controlled discharge current that causes the piezoelectric device to expand, releasing the force thereby decreasing the force applied by the piezo actuators. The charge/voltage may advantageously be removed over a relatively short period of time to provide tactile feedback to the user. Absent an external force and absent a charge/voltage at the piezo actuator, the piezo actuator may be slightly bent due to a mechanical preload.

The touch-sensitive display 118 is configured to display information from an application, such as a web browser, contacts, email, calendar, music player, spreadsheet, word processing, operating system interface, and so forth, in a display area. A virtual keyboard may be displayed in an input area, for example, below the display area in the orientation of the portable electronic device 100 and includes keys for entry of alphanumeric characters, punctuation or symbols.

The touch-sensitive display 118 is also configured to detect a gesture. A gesture, such as a swipe, is a type of touch, also known as a flick, that begins at an origin and continues to a finish point while touch contact is maintained. A swipe may be long or short in distance and/or duration. Two points of the swipe are utilized to determine a vector that describes a direction of the swipe. The direction may be referenced with respect to the touch-sensitive display 118, the orientation of the information displayed on the touch-sensitive display 118, or another reference. For the purposes of providing a reference, "horizontal" as utilized herein is substantially left-to-right or right-to-left relative to the orientation of the displayed information, and "vertical" as utilized herein is substantially upward or downward relative to the orientation of the displayed information. The origin and the finish point of the swipe may optionally be utilized to determine the magnitude or distance of the swipe. The duration of the swipe is determined from the origin and finish point of the swipe in time. The controller 116 and/or the processor 102 determine the direction, magnitude, and/or duration of the swipe.

When a gesture such as a swipe is detected and associated with the display area of the touch-sensitive display 118, page scrolling within the information occurs. Page scrolling is a mode of scrolling in which the information may be advanced or reversed as the information is displayed. The direction of page scrolling may be based on the direction of the swipe. When a swipe is associated with the input area of the touch-sensitive display 118, cursor scrolling of the information occurs. Cursor scrolling is a mode of scrolling in which a cursor is rendered on the touch-sensitive display 118 and may be advanced or reversed, depending on the direction of the swipe, through the information displayed on the touch-sensitive display. The cursor scrolls through the information while maintaining display of the cursor. Alternatively, cursor scrolling may be utilized when a gesture is associated with the display area, and page scrolling may be utilized when a gesture is associated with the input area.

Because a touch-sensitive display 118 on a portable electronic device 100 is typically relatively small, the amount of information displayed is typically much less than the amount of information that may be displayed, for example, on a computer monitor or other larger device. Information from an application, based on the screen size and memory capability of the device controlling the display of information on the screen, is available to be displayed using scrolling techniques. The amount of information is often more than fits on a screen or window at one time.

The information may comprise, for example, a webpage, electronic messaging or mail text, contact details, calendar event details, spreadsheet data, text or word processing, to name a few. For example, when entering calendar event details for scheduling a calendar event, the calendar application may display of 10 lines of information at a time while displaying a virtual keyboard for entry of data in fields of the calendar event. The calendar event, however, may include 50 lines of information. Typically, a user may advance or reverse through the information by scrolling using a control such as a button or menu option. The use of a scrolling mode that is determined based on the association of the gesture, such as the gesture's origin, finish point, or other attribute, rather than selection of a button or use of a menu facilitates quicker, seamless navigation and interaction. Page scroll or cursor scroll may be immediately engaged or utilized at any time. Without the need to find and press a button or to enter a menu, the process of navigating to view, add, delete, and edit data is faster.

Figure 2:
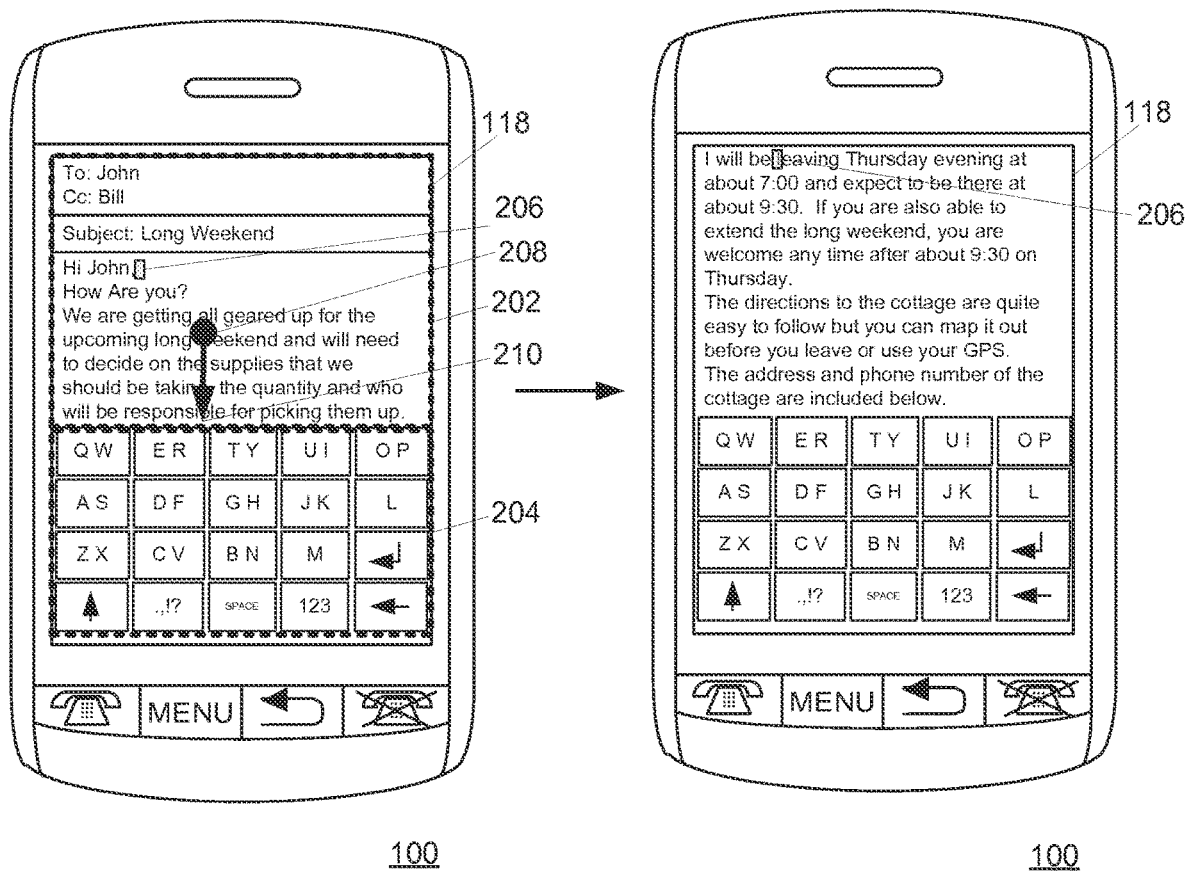
FIG. 2 illustrates examples of a display before and after scrolling in a first mode in accordance with the present disclosure.
Figure 3:
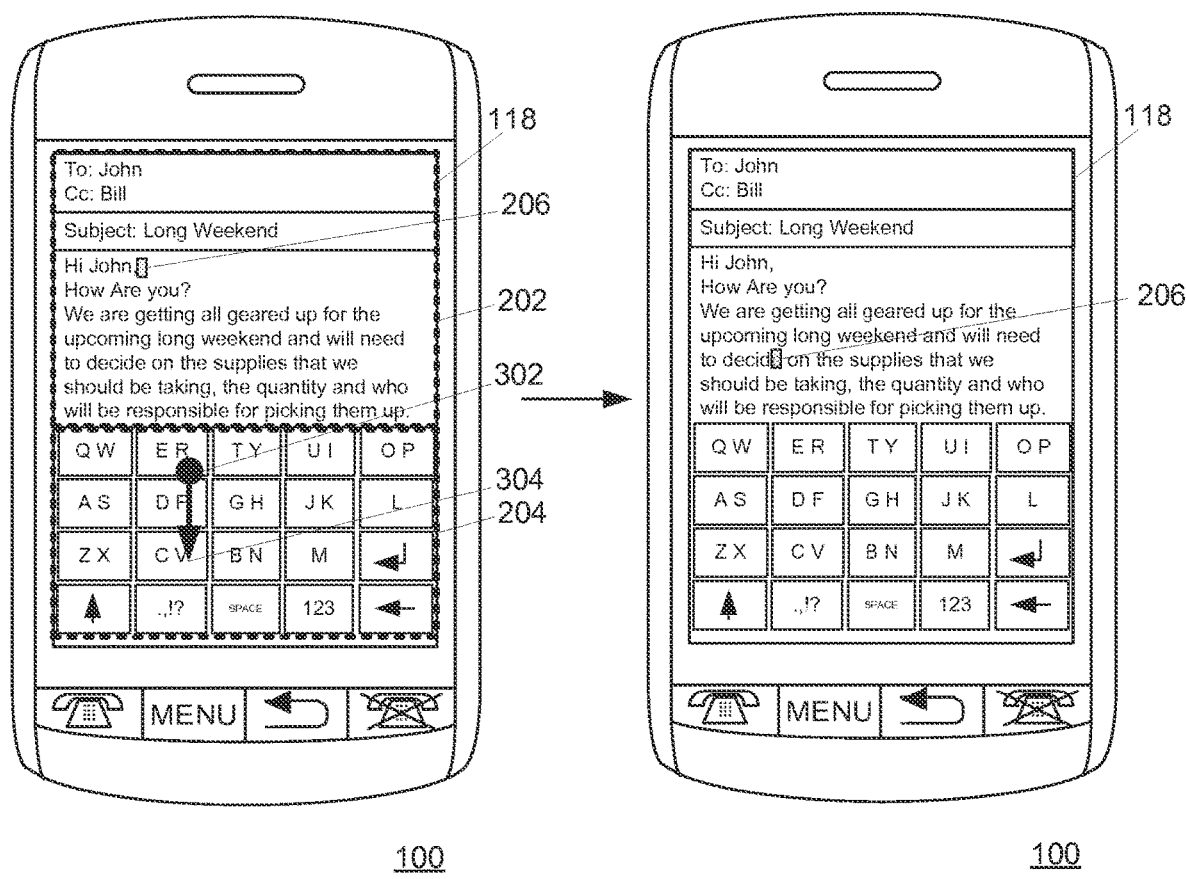
FIG. 3 illustrates examples of a display before and after scrolling in a second mode in accordance with the present disclosure.

An example of a touch-sensitive display 118 before and after scrolling in a first mode is shown in FIG. 2, and an example of a touch-sensitive display 118 before and after scrolling in a second mode is shown in FIG. 3. In these examples, the portable electronic device 100 is utilized for composing and sending an email utilizing an email application. Information entered is displayed in a display area 202 of the touch-sensitive display 118, and a virtual keyboard is displayed in an input area 204 of the touch-sensitive display 118. The display area 202 is disposed above the input area 204 in the orientation in which the information is displayed. The virtual keyboard includes keys for entry of characters such as letters, numbers, punctuation, symbols, and so forth, as well as functions, such as shift, enter, or delete, for composing the email and may be a reduced keyboard in which at least some of the keys are associated with multiple alphabetical letters. Optionally, the keyboard may be a full keyboard in which each alphabetical letter is associated with a respective key.

The information includes, for example, email header fields such as a "To" field, a "Cc" field, a "Subject" field and a body field. Each of the fields of the email may be edited during composition of the email and a cursor 206 is shown rendered in the information. The cursor 206 indicates, for example, the position, within the information, at which additions, deletions, or edits may be made. The user may scroll through the email in the page scrolling mode to view or edit any of the fields of the email. The origin 208 is shown in FIG. 2 in the display area 202 on the touch-sensitive display 118 and the direction of the gesture is downward with respect to the displayed information, to the finish point at the tip of the arrow 210. When the gesture is detected, the touch-sensitive display 118 advances through the information, thereby displaying different information. Similarly, page scrolling may be in the reverse direction to display prior information utilizing an upward gesture with respect to the displayed information and with the origin of the gesture in the display area 202. Page scrolling may additionally occur in the horizontal direction with respect to the displayed information.

Optionally, the length of the gesture, either by distance or time duration, may be utilized to determine what part of the information to display or to determine how far to advance or reverse the information. Two, three, or more levels of distinction may be utilized. For example, a two-level system divides gestures into short gestures and long gestures, wherein one or more thresholds are utilized to determine whether a gesture is considered long or short. A short gesture advances or reverses the information by an amount, such as shown in FIG. 2 and a long gesture advances or reverses the information a greater amount.

A long gesture may be utilized to jump to the end or the beginning of the information or may be interpreted as advancing or reversing the information by a large amount. The amount of scrolling may vary depending on the amount of information.

A three-level system divides gestures into short gestures, medium gestures, and long gestures, wherein two or more thresholds are utilized to determine whether a gesture is considered short, medium, or long. For example, short gesture may be interpreted as advancing or reversing by an amount, a medium gesture may be interpreted as advancing or reversing by a greater amount, and a long gesture may be interpreted as advancing or reversing to the end or start of the information. The thresholds for the length may be based on dimensions of the touch-sensitive display 118. Alternatively, the long gesture may be interpreted as one that begins on the screen and continues off the edge of the screen 118, whereas the short and medium gestures are determined by a threshold and these gestures both originate and end on the screen 118.

Figure 4:
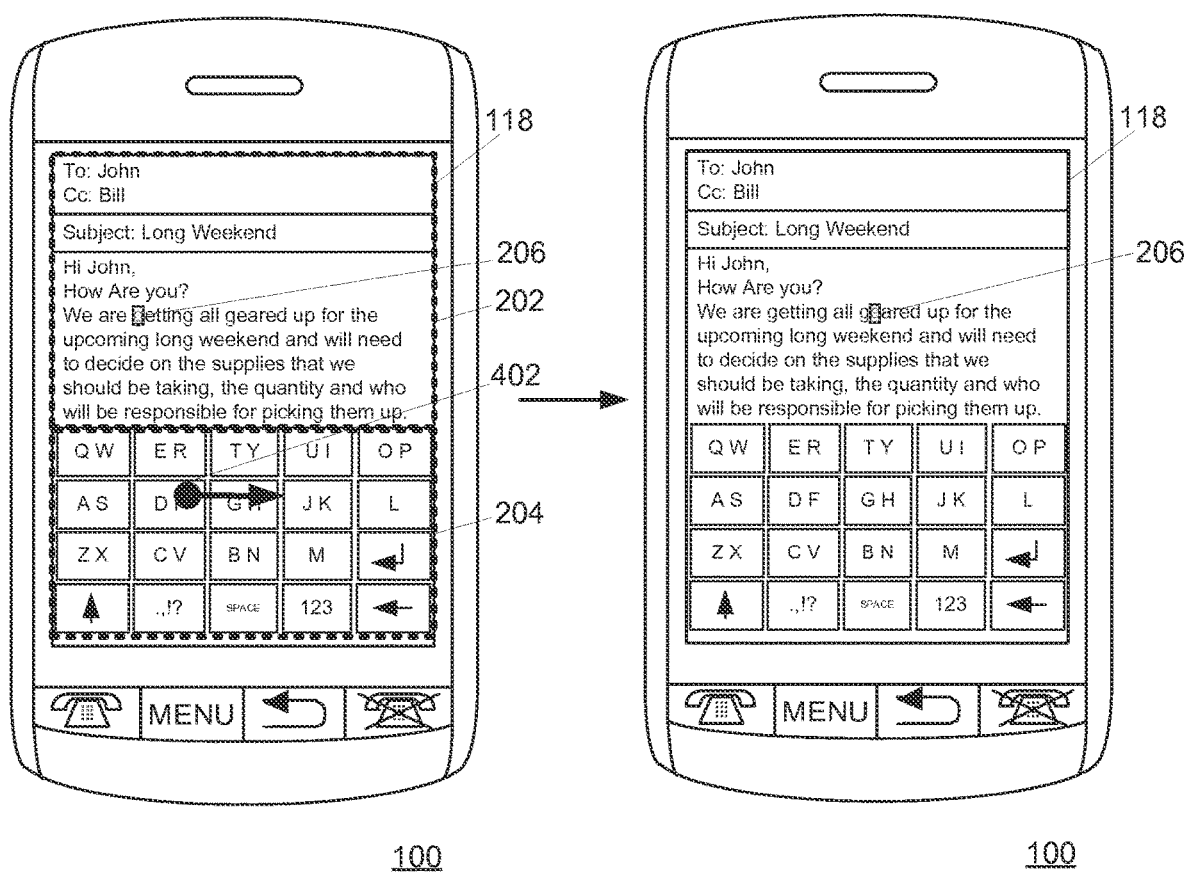
FIG. 4 illustrates examples of a display before and after scrolling in a second mode in accordance with the present disclosure.

The user may scroll through the email in the cursor scrolling mode to move the cursor 206 within the information. The origin 302 is shown in FIG. 3 in the input area 204 on the touch-sensitive display 118, and the direction of the gesture is downward with respect to the displayed information, to the finish point at the tip of the arrow 304. When the gesture is detected, the touch-sensitive display 118 moves the cursor 206 to a new location within the information. The movement of the cursor is advantageously in the same direction as the direction of the gesture. Thus, the cursor 206 may be moved within the information without page scrolling through the information. For example, when the cursor 206 is located near the top of the display area 202 and a downward gesture is detected with an origin in the input area 204, cursor scrolling is initiated. The information displayed on the touch-sensitive display 118 may, however, be advanced to move the cursor within the information during cursor scrolling, for example, when the cursor 206 is located near the bottom of the display area 202 and a downward gesture is detected with an origin in the input area 204. Cursor scrolling may also occur in the reverse direction, to move the cursor up in the information, for example, when an upward swipe is detected with the origin of the gesture in the input area 204. Cursor scrolling may occur horizontally to move the cursor laterally within the information. Detection of a horizontal gesture, from right to left or from left to right, such as the gesture with origin 402 in the input area 204 shown in FIG. 4.

Optionally, the length of the gesture, either by distance or time duration, may be utilized to determine how far to advance or reverse the cursor 202 within the information. Two, three, or more levels of distinction may be utilized. A short gesture may advance or reverse the cursor by one line of information or one character and a long gesture may advance or reverse the cursor by more than one line of information or more than one character.

A long gesture may be utilized to move the cursor to the end or the beginning of the information for a generally vertical gesture or may be used to move the cursor to the end or beginning of a line for a generally horizontal gesture. Alternatively, a long gesture may be interpreted as advancing or reversing the cursor within the information by multiple lines or characters. The number of multiples may vary.

Figure 5:
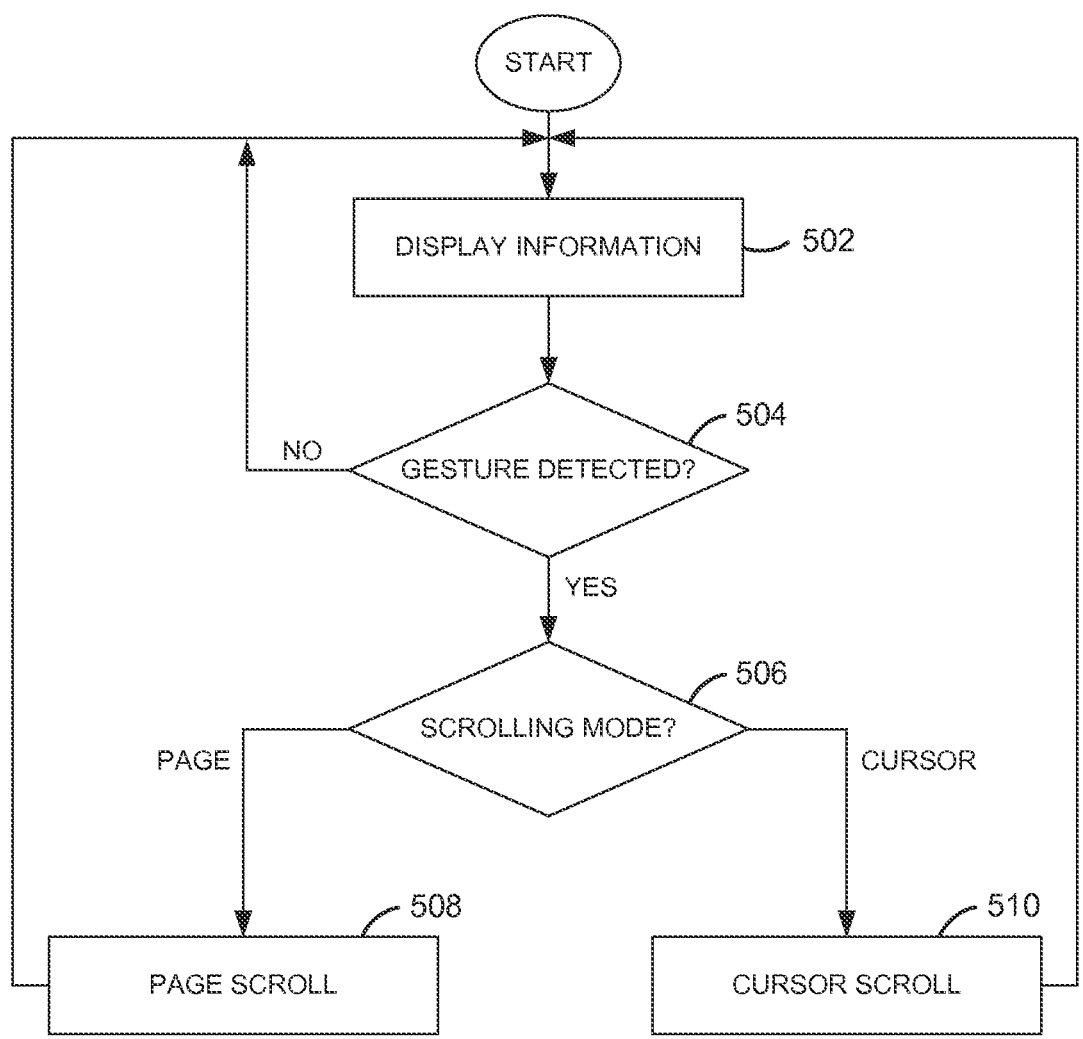
FIG. 5 is a flowchart illustrating a method of scrolling through displayed information on a portable electronic device in accordance with the present disclosure.

FIG. 5 is a flowchart illustrating a method of displaying information based on a detected gesture. The method may be carried out by software executed by, for example, the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium. Information is displayed 502 on the touch-sensitive display 118 of the portable electronic device 100. In the example shown, an email is navigated through in an email application. When a gesture is detected 504, an association of the gesture with an area of the touch-sensitive display 118 is determined. For example, an origin, finish point, percentage of gesture located in an area, or other characteristic may be identified to determine which area, e.g., display area 202 or input area 204, is associated with the gesture. A direction of the gesture may also be determined, and the direction of scrolling may be based on the direction of the gesture. The scrolling mode is determined 506 based on the association, e.g., origin, finish point, percentage of area, and so forth. When the association of the gesture is with the display area 202 of the touch-sensitive display 118, e.g., when the origin of the gesture is at a location associated with the display area 202, the page scrolling mode is utilized, and the information is page scrolled 508, for example, based on the direction of the gesture. The page scrolling mode may optionally include determining a length of the gesture and displaying a different part of the information based on the length of the gesture. When the association of the gesture is with the input area 204 of the touch-sensitive display 118, e.g., when the origin of the gesture is at a location associated with the input area 204, the cursor scrolling mode is utilized, and the cursor 202 is scrolled 510 through the information.

A method of controlling a portable electronic device that has a touch-sensitive display, includes displaying information on the touch-sensitive display, detecting a gesture on the touch-sensitive display, scrolling through the information in a first scrolling mode when the gesture is associated with a first area of the touch-sensitive display, and scrolling through the information in a second scrolling mode when the gesture is associated with a second area of the touch-sensitive display.

A computer-readable medium has computer-readable code embodied therein that is executable by at least one processor of a portable electronic device to perform the above method.

A portable electronic device includes a touch-sensitive display configured to display information. A processor is configured to detect a gesture on the touch-sensitive display, scroll through the information in a first scrolling mode when the gesture is associated with a first area of the touch-sensitive display, and scroll through the information in a second scrolling mode when the gesture is associated with a second area of the touch-sensitive display.

The method of scrolling described herein facilitates interaction and selection, for example, of a cursor position within information displayed for editing. A detected swipe on a touch screen display may be utilized to scroll in either of two modes, in any direction for viewing the information. The mode for scrolling is determined based on the association of the gesture with a display area, and enables scrolling in either of the two modes without requiring any further button, menu, or other more time-consuming process. Thus, different parts of information may be displayed and/or edited more quickly, decreasing power requirements, and increasing battery life, and providing an improved user experience.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

The invention claimed is:

1. A method comprising:
providing text for display on a touch-sensitive display of an electronic device;
displaying a first portion of the text in an area of the touch-sensitive display and providing a virtual keyboard disposed below the area relative to the orientation in which the first portion of text is displayed;
receiving a first gesture on the touch-sensitive display, the first gesture including an origin and an end point;
determining, by a processor of the electronic device, the origin of the first gesture on the touch-sensitive display;
in response to determining by the processor, that the origin of the first gesture is on the area of the touch-sensitive display, scrolling through the text to display a second portion of the text in the area, wherein the second portion of the text is different from the first portion of the text, and an amount of scrolling through the text in response to determining that the origin of the first gesture is on the area of the touch-sensitive display, is dependent on a length of the first gesture;
receiving a second gesture on the virtual keyboard, the second gesture including an origin and an end point; and
in response to determining by the processor, that the origin of the second gesture is on the virtual keyboard and that the second gesture continues across keys of the virtual keyboard, scrolling a cursor, indicating an editing position within the text, through the text, starting from the second portion of the text, in a direction dependent on a direction of the second gesture such that the cursor scrolls through the text in an upward direction in response to detecting the second gesture is in the upward direction, and the cursor scrolls through the text in a downward direction in response to detecting the second gesture is in the downward direction, and displaying a third portion of the text in the area to advance the cursor through the third portion of the text during scrolling the cursor when the cursor is located near an edge of the area, wherein the third portion of the text is different from the second portion of the text and includes text not included in the second portion of the text, and an amount of scrolling the cursor through the text from the second portion of the text to the third portion of the text is dependent on a length of the second gesture across the keys of the virtual keyboard.

2. The method according to claim 1, wherein the amount of scrolling through the text in response to determining that the origin of the first gesture is on the area of the touch-sensitive display, is also dependent on a total amount of the text provided for display.

3. The method according to claim 1, wherein scrolling through the text in response to determining that the origin of the first gesture is on the area of the touch-sensitive display, comprises page scrolling.

4. The method according to claim wherein the first and second gesture comprises a swipe.

5. The method according to claim 1, wherein the virtual keyboard is configured to receive input to add to the text provided for display in the area.

6. A non-transitory computer-readable medium having computer-readable code executable by at least one processor of the portable electronic device to:
provide text for display on a touch-sensitive display of an electronic device;
display a first portion of the text in an area of the touch-sensitive display and provide a virtual keyboard disposed below the area relative to the orientation in which the first portion of text is displayed;
receive a first gesture on the touch-sensitive display, the gesture including an origin and an end point;
determining, by a processor of the electronic device, the origin of the first gesture on the touch-sensitive display;
in response to determining, by the processor, that the origin of the first gesture is on the area of the touch-sensitive display, scroll through the text to display a second portion of the text in the area, wherein the second portion of the text is different from the first portion of the text, and an amount of scrolling through the text in response to determining that the origin of the first gesture is on the area of the touch-sensitive display, is dependent on a length of the first gesture;
receiving a second gesture on the virtual keyboard, the second gesture including an origin and an end point; and
in response to determining, by the processor, that the origin of the second gesture is on the virtual keyboard and that the gesture continues across keys of the virtual keyboard, scroll a cursor, indicating an editing position within the text, through the text, starting from the second portion of the text, in a direction dependent on a direction of the second gesture such that the cursor scrolls through the text in an upward direction in response to detecting the second gesture is in the upward direction, and the cursor scrolls through the text in a downward direction in response to detecting the second gesture is in the downward direction, and display a third portion of the text in the area to advance the cursor through the third portion of the text during scrolling the cursor when the cursor is located near an edge of the area, wherein the third portion of the text is different from the second portion of the text and includes text not included in the second portion of the text, and an amount of scrolling the cursor through the text from the second portion of the text to the third portion of the text is dependent on a length of the second gesture across the keys of the virtual keyboard.

7. A portable electronic device comprising:
a touch-sensitive display configured to receive a first gesture including an origin and an end point;
and a processor coupled to the touch-sensitive display and configured to:
provide text for display on a touch-sensitive display of an electronic device;
display a first portion of the text in an area of the touch-sensitive display and provide a virtual keyboard disposed below the area relative to the orientation in which the first portion of text is displayed;
detect the first gesture received on the touch-sensitive display;
determine, by the processor, the origin of the first gesture on the touch-sensitive display;
in response to determining that the origin of the first gesture is on the area of the touch-sensitive display, scroll through the text to display a second portion of the text in the area, wherein the second portion of the text is different from the first portion of the text, and an amount of scrolling through the text is dependent on a length of the first gesture;
receiving a second gesture on the virtual keyboard, the second gesture including an origin and an end point; and
in response to determining that the origin of the second gesture is on the virtual keyboard and that the gesture continues across keys of the virtual keyboard, scroll a cursor, indicating an editing position within the text, through the text, starting from the second portion of the text, in a direction dependent on a direction of the second gesture such that the cursor scrolls through the text in an upward direction in response to detecting the second gesture is in the upward direction, and the cursor scrolls through the text in a downward direction in response to detecting the second gesture is in the downward direction, and display a third portion of the text in the area to advance the cursor through the third portion of the text during scrolling the cursor when the cursor is located near an edge of the area, the third portion of the text is different from the second portion of the text and includes text not included in the second portion of the text, and an amount of scrolling the cursor through the text from the second portion of the text to the third portion of the text, is dependent on a length of the second gesture across the keys of the virtual keyboard.

* * * * *